United States Patent [19]

Danico

[11] Patent Number: 4,560,083
[45] Date of Patent: Dec. 24, 1985

[54] CLOSURE AND METHOD FOR AN APERTURE

[75] Inventor: Henry F. Danico, Stoneham, Mass.

[73] Assignee: TRW Inc., Cleveland, Ohio

[21] Appl. No.: 571,316

[22] Filed: Jan. 16, 1984

[51] Int. Cl.⁴ ............................................. B65D 39/00
[52] U.S. Cl. .................................... 220/307; 220/241; 220/326
[58] Field of Search ............... 220/241, 242, 307, 323, 220/326, 359

[56] References Cited

U.S. PATENT DOCUMENTS

| | | | |
|---|---|---|---|
| 3,278,066 | 10/1966 | George et al. | 220/241 |
| 3,851,794 | 12/1974 | Hehl. | |
| 3,900,130 | 8/1975 | Andrews. | |
| 3,944,107 | 3/1976 | Wallace et al. | |
| 3,990,604 | 11/1976 | Barnett et al. | |
| 4,091,962 | 5/1978 | Van Buren, Jr. | 220/307 |
| 4,094,436 | 6/1978 | Birmingham. | |
| 4,290,536 | 9/1981 | Morel. | |
| 4,391,384 | 7/1983 | Moore, III et al. | |

Primary Examiner—George T. Hall
Attorney, Agent, or Firm—Daniel G. Blackhurst

[57] ABSTRACT

A closure and method for closing an aperture in a panel includes a plate member having a planar inside face, a peripheral edge, and a plurality of retaining tabs which depend from the inside face. The plate member has a spaced recess formed in the inside face adjacent each retaining tab and extending inwardly from the peripheral edge. A sealing member or gasket comprised of an expansible elastomeric material is interposed between the inside face of the plate member and the edge of a panel aperture. The plate member is configured relative to the panel aperture and the gasket member such that the gasket member is effectively in a confined space. The confined space is preferably defined by a marginally depending edge on the plate and a depending center portion which is adapted to enter the panel aperture. When the elastomeric material is thereafter exposed to elevated temperatures, it expands to fill the confined space between the plate member and the panel. By so confining the elastomeric material, a superior seal is obtained since the material is not permitted to flow freely from between the plate and edge of the panel aperture.

19 Claims, 5 Drawing Figures

U.S. Patent        Dec. 24, 1985        4,560,083
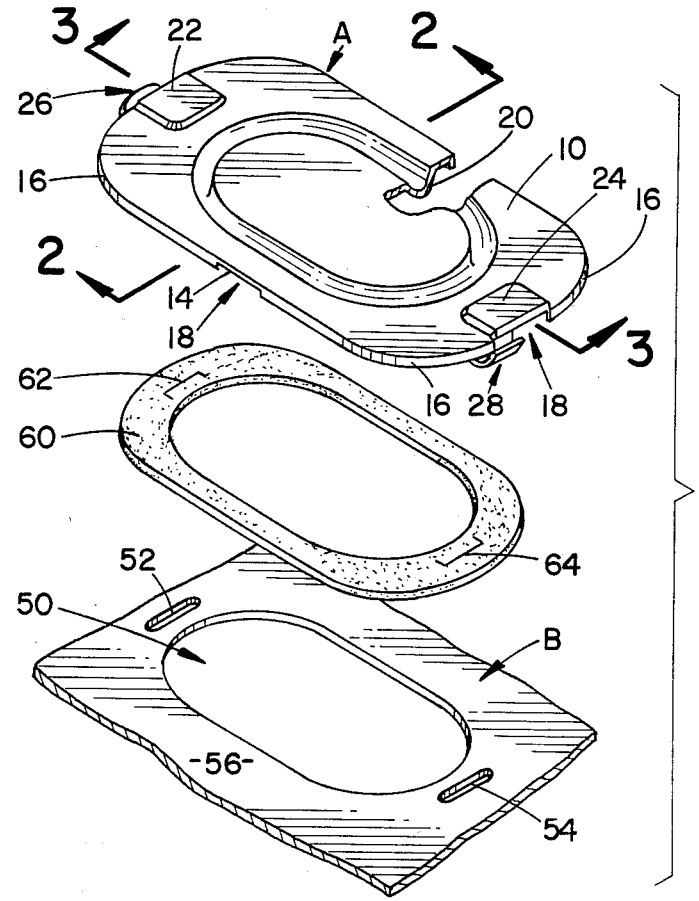
FIG. 1
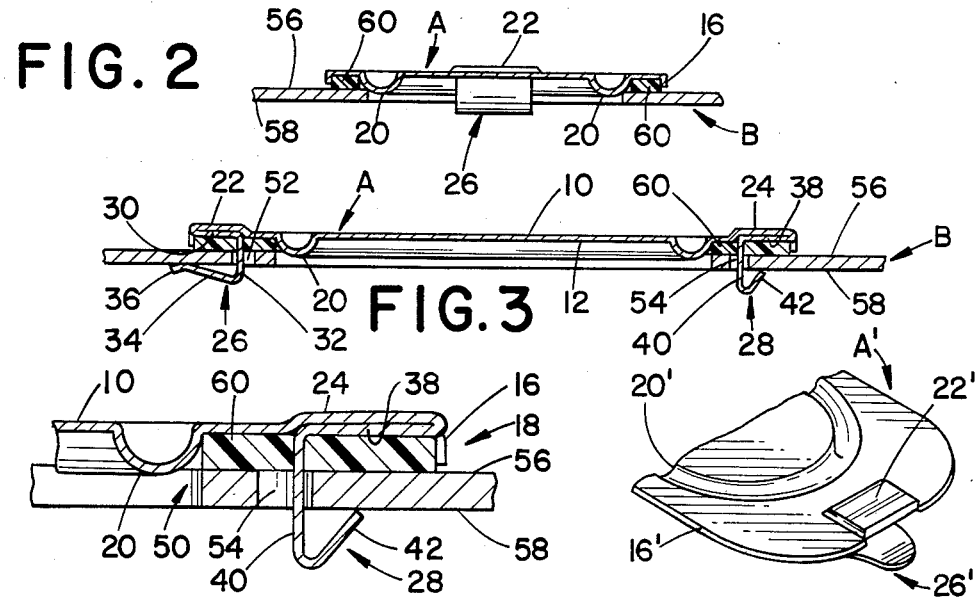
FIG. 2
FIG. 3
FIG. 4    FIG. 5

CLOSURE AND METHOD FOR AN APERTURE

BACKGROUND OF THE INVENTION

This invention relates generally to closure devices which can be secured in apertures for closing and sealing same. More specifically, the present invention relates to a closure for use with openings or apertures formed in thin plates or sheets of metal or other rigid material. Although the invention will be described with particular reference to such a closure used in covering an opening in a vehicle body panel, it will be recognized that certain features of the invention may be used or adapted to use in closure assemblies for other purposes and/or in other environments.

In the manufacture of vehicles, closure devices are used to permanently close various body panel apertures or openings which have served their intended purpose and are not longer required, or to perform some other useful function such as to reduce the effective diameter of an opening to a desired new size or to provide a suitable mounting surface for another component. Such openings may be required initially for many reasons, eg., as paint discharge openings or access openings to accommodate mounting of vehicle components. These apertures should be tightly covered or filled after they have served their useful function for excluding moisture, road dirt, noise, exhaust fumes, and the like.

One conventional closure device includes a plate provided with retaining tabs. The plate is sized to cover a body panel aperture, and the tabs fit into separate, identical openings positioned at either end of the aperture. A heat expansible gasket is interposed between the area of the body panel immediately surrounding the aperture and the plate for establishing a seal therebetween. Such a closure is disadvantageous because when the gasket material is heated, it expands in an unconfined manner in all directions, and sometimes does not fill and effectively seal all the spaces between the plug and the edge of the body panel aperture.

It has, therefore, been considered desirable to develop a new and improved closure assembly for a panel aperture which would overcome the foregoing difficulties and others while providing better and more advantageous overall results.

BRIEF SUMMARY OF THE INVENTION

According to the invention, a closure assembly is provided for an aperture in a panel. The assembly includes a plate member adapted to be secured by means of retaining tabs in a covering relationship with the panel aperture. A gasket comprised of a heat expansible material is interposed between the plate member and panel. The plate member includes means for confining the gasket relative to the panel in a manner to enhance the sealing results obtained therefrom.

In accordance with the preferred construction of the assembly, a first confining means is located inwardly adjacent the aperture, and a second confining means is located radially outward from the aperture when the plate member is in the installed position.

In accordance with a further aspect of the invention, the tabs are located in recessed areas on the face of the plate, and each recessed area receives a portion of an associated tab for accommodating more even expansion of the gasket material. The tabs are also located generally midway between the first and second confining means so that they are completely surrounded by gasket material and a good seal is obtained.

In accordance with yet another aspect of the invention, a method for covering an aperture in a panel is provided. The method includes providing a cover plate member having a slightly greater area than the aperture to be covered; placing a heat expansible sealing material between overlapping portions of the panel and plate member; securing the plate member in a covering relationship with the aperture; and, confining the sealing material between the plate member and panel at least during exposure of the material to elevated temperatures.

The principal focus of the present invention is the provision of an improved closure assembly and method for closing an aperture in a panel.

One advantage of the invention is the provision of such an assembly and method which can securely close and seal a panel aperture.

Another advantage is the capability of the assembly and method to restrain expansion of a heat expansible sealing material interposed between the closure assembly and a panel having the aperture to be covered.

Still other advantages and benefits of the invention will become apparent to those skilled in the art upon a reading and understanding of the following detailed description.

BRIEF DESCRIPTION OF THE DRAWINGS

The invention may take form in certain parts and arrangements of parts, preferred and alternate embodiments of which will be described in detail in this specification and illustrated in the accompanying drawings which form a part hereof and wherein:

FIG. 1 is an exploded perspective view of an aperture closure assembly formed in accordance with the present invention;

FIG. 2 is a cross-sectional view taken along lines 2—2 of FIG. 1;

FIG. 3 is a cross-sectional view taken along lines 3—3 of FIG. 1;

FIG. 4 is an enlarged view of the right-hand portion of FIG. 3; and,

FIG. 5 is an enlarged perspective view of a portion of an alternate embodiment of a closure assembly formed in accordance with the present invention.

DETAILED DESCRIPTION OF THE PREFERRED AND ALTERNATE EMBODIMENTS

With reference to the drawings, wherein the showings are for purpose of illustrating preferred and alternate embodiments of the invention only, and not for purposes of limiting same, FIG. 1 shows the new cover assembly as comprising a cover plate member A which is to be securely affixed to a panel member B for purposes of covering an aperture in the panel.

Plate member A has a first or outer generally planar face 10 and a second or inner generally planar face 12 (FIG. 3). The outer peripheral edge 14 of the plate includes a discontinuous flange 16 which depends in the direction of inner face 12. In the preferred arrangement, flange 16 is comprised of four flange segments or portions which are separated from each other by four openings 18. While only three of flange segments 16 and two of openings 18 are visible in FIG. 1, the openings are located so as to divide the flange into four equal segments. Of course, other flange configurations could also be used if desired without departing from the overall intent of the invention. In the preferred embodiment, plate member A is stamped and formed from sheet metal so that all the structural features are integral therewith.

Referring now to both FIGS. 2 and 3, rib 20 is formed into the plate A from outer face 10 so as to extend outwardly of inner face 12. Rib 20 has a generally oval conformation (FIG. 1), and is dimensioned in a particular manner for reasons which will be described hereinbelow. A pair of generally rectangular recesses 22, 24 are provided in inner face 12. The first recess 22 houses a portion of a first or L-shaped tab or leg 26, and the second recess 24 houses a portion of a second or J-shaped tab or leg 28. First and second tabs 26, 28 comprise integral parts of plate A, and are formed from elongated tongue-like extensions.

A first portion 30 of first tab 26 is folded back into recess 22 and against lower face 12 of the plate so that the outer surface of the fold is substantially flush with the adjacent surface area of the inner face. A second portion 32 of the first tab projects outwardly of the lower face generally transverse to first portion 30. A third portion 34 of the first tab extends generally transverse to the second portion 32 in a direction outwardly toward plate peripheral edge 14. It is desirable, however, that third portion 34 be angled somewhat toward first portion 30. The third portion terminates in an outer free end 36 which extends outwardly beyond the plate peripheral edge.

Second tab 28 has a first portion 38 which is folded back into recess 24 against lower face 12 similar to first portion 30 of first tab 26. A second portion 40 extends outwardly of the inner face generally transverse to first portion 38. A third portion 42 extends back toward the first portion but does not extend beyond plate peripheral edge 14.

It should be noted that tab first portions 30, 38 are crushed or peened along their fold lines with plate A so that there is no open space at either of the folds, and so that the outer surfaces of the folds are substantially flush with the adjacent surfaces of the plate (FIGS. 3 and 4). This creates a continuous annular surface around the periphery of the plate, and insures that there are no gaps at the junctions between the plate and tabs which might allow moisture, oil, dirt and the like to penetrate the cover assembly.

With reference again to FIG. 1, an aperture 50 is included in the panel B. As shown, aperture 50 has an oval configuration, although it should be appreciated that the subject invention is equally applicable to apertures having other configurations, including square, rectangular, circular, irregular, etc. Normally, plate A will have the same general conformation, although larger, than the panel aperture with which it is to be associated. Such relationship allows the plate to cover the aperture and overlie a margin area of panel B which surrounds the aperture. Thus, in the case of the construction shown in FIGS. 1–3 of the subject application, aperture 50 is oval so plate A has a similar, but larger, oval shape. However, such correspondence between the aperture and plate is not necessary to successful practice of the invention. Rib 20 (FIG. 1), in turn, has the same peripheral conformation as the aperture, and is dimensioned to be received within the aperture when plate A is installed on panel B (FIGS. 2 and 3). It is also to be noted that rib 20 extends further outwardly of plate inner face 12 than does flange 16.

As best shown in FIG. 1, a pair of tab receiving slots 52,54 are disposed in panel B in a spaced relationship from the end areas of aperture 50. These slots are dimensioned and spaced apart from each other in a manner to receive first and second tabs 26,28, respectively, as will be described. it should be noted, however, that the shape and positioning of slots 52,54 relative to aperture 50 are a function of the shape and location of tabs 26,28 on the cover plate.

Preferably, a flat, annular sealing member or gasket 60 is interposed between plate A and panel B. When the plate is secured in aperture 50 by means of tabs 26, 28, gasket 60 is effectively captured or constrained between plate lower face 12, panel upper surface 56, plate flange 16, and plate rib 20. The gasket is configured so that, in its uncured state, it is dimensioned to be mounted to cover plate A at inner face 12 and substantially fill the radial area between rile 20 and flange 16 (FIGS. 2 and 3). To accommodate such mounting, the gasket includes a pair of slit or slot areas 62,64 dimensioned and positioned to received tabs second portions 32,40, respectively. Thus, it is to be noted that the tab second portions will be completely surrounded by the seal material when plate A is installed on panel B.

As mentioned, plate A is somewhat larger than aperture 50 so that it overlies a margin-like portion of panel upper surface 56. To secure the plate and gasket to the panel, first tab 26 is inserted into slot 52 and moved into the position generally shown in FIG. 3. Second tab 28 is then brought to a position adjacent slot 54, and thereafter pushed therethrough. During this pushing, third portion 42 engages the side edge of the slot and is flexed inwardly toward second portion 40 until the outer free end thereof is moved to the underside 58 of the panel. At that time, the third portion flexes outwardly again to a locking position as shown in FIGS. 3 and 4. Tab third portions 34, 42 retain plate A in slots 52,54 in a covering relationship with aperture 50, and prevent its subsequent removal since the end areas of the third portions are disposed in contact with the panel underside.

Preferably, gasket 60 is constructed of a material which has elastomeric properties and foams or expands when heated. The gasket is filled with a conventional chemical blowing agent or physical foaming agent which foams and undergoes considerable permanent volumetric expansion, ie., between 75% and 150%, when exposed to elevated temperatures. In the uncured state, the gasket material should also have a durometer hardness reading of between 75 and 90, and a density of approximatey one gram per cubic centimeter. The gasket material should also be water and solvent resistant.

Preferably, the gasket material undergoes gradual cross linking during exposure to elevated temperatures. Because this cross linking provides a slowly increasing melting point and an increasing resistance to flow, there is a reduced chance that the gasket material will melt out from the interstices between plug A and panel B if the material is subjected to excessively long periods of high temperature through accident, inadvertence, or the like. The cross linking also increases the resistance of the gasket material to solvents such as gasoline or oil.

Suitable materials for gasket 60 include thermoplastic elastomers and particularly, polyolefins such as ethylene, propylene copolymers, polyethylene, ethylene copolymers, terpolymers, ionomers, polyvinylchloride polymers, and styrene-butadiene block copolymers. Also, either one or both sides of gasket 60 may advantageously be coated with a flowable hot melt adhesive to facilitate adhesion to plate member A and/or panel B.

Again, outer flange 16 provided on the plate member retards and constrains expansion of the gasket material past the outer periphery 14 of the plate, and inner rib 20 retards and constrains inward expansion of the expanding gasket material. In this way, the expanding gasket material is channeled or directed to all areas or voids defined between flange 16, rib 20, plate inner surface 12, and panel surface 56, including the areas around tab second portions 32,40, recesses 22,24, and panel slots 52,54. Any excess gasket material will expand or flow through apertures 18 provided at the tabbed portions of the plate, and some excess gasket material will flow outwardly through apertures 18 on the sides of the plate. Also, some small excess of the gasket material dsmay flow between the dlower edge of flange 16 and panel surface 56, and between rib 20 and the edge of aperture 50. Such flow enhances sealing of plate A relative to the panel aperture, and provides a reliable seal which will effectively withstand a variety of forces exerted thereagainst.

The plate member of the subject closure assembly is particularly suited for use in closing panel apertures in vehicle bodies. A widely used process in the manufacture of such bodies may variously involve immersing them in a rustproofing agent, a paint primer, or paint. As the bodies are raised from a bath of such liquid, body apertures, e.g., aperture 50 illustrated in the FIGURES, enable the excess liquid to run back down into the bath.

After plate member A with gasket 60 has been secured in the body panel as described above, the vehicle body is passed through a paint oven. There, the body may be subjected to temperatures of approximately 140° C. to 170° C. The temperature of the oven thus causes the gasket material to foam and expand for filling surface irregularities and open areas between the plate and panel as also described above. As the gasket cools, it bonds to both of plate member A and panel B to thereby seal aperture 50 against the incursion of any harmful elements from externally of the vehicle body.

It will be appreciated that the gasket may be attached to panel B or to plate A in any convenient manner prior to installation of the plate. Also, the shape of the gasket 46 may be modified as desired and/or necessary for accommodating various plate and/or aperture shapes and sizes.

While two tabs 26, 28 are shown in the preferred embodiment, it is to be appreciated that the number and location of the tabs can be varied as necessary and/or appropriate. For instance, a greater number of tabs may be required to suit a particular application in which plate A is required to have a greater size. Likewise, different locations for the tabs may be desirable where the plate has an irregular shape. However, none of these modifications in any way departs from the overall intent or scope of the invention.

With reference now to FIG. 5, an alternate embodiment of the closure assembly formed according to the present invention is shown. For ease of illustration, like components have been identified by like numerals with a primed (') suffix. In FIG. 5, plate member A' is substantially identical to the plate member of the preferred embodiment except for the absence of a flange at the plate peripheral edge 14'. This alternate embodiment may be useful where restraining the outward expansion of the gasket material upon heating is not required, or where such outward expansion is restrained by an integral ridge or rib provided on the panel itself. It should be noted that inward expansion of the gasket still would be restrained by the rib 20' as in the preferred embodiment.

Among the advantages afforded by the present invention is the provision of a closure assembly which is firmly adhered and reliably sealed to an associated plate for preventing the ingress of harmful moisture and/or dirt through a body panel aperture. Also, the closure assembly of the present invention will remain reliably seated despite vibrations in the vehicle. Moreover, the subject closure assembly can be made in a simple and economical manner, and can be inserted reliably and quickly into a covering relationship with an associated aperture.

Although the invention has been shown and described with reference to preferred and alternate embodiments, it is apparent that modifications and alterations will occur to others upon a reading and understanding of this specification. It is intended to include all such modifications and alterations insofar as they come within the scope of the appended claims or the equivalents thereof.

Having thus described the invention, it is now claimed:

1. A closure assembly for closing an aperture in a panel comprising:
   a thin plate member having an inner face portion, a peripheral edge and a plurality of tabs which depend from said inner face, said plate member inner face having tab receiving recesses at said peripheral edge receiving a first portion of each tab, said tabs having locking portions adapted to retain said plate member positioned on one side of a panel in a closing relationship with a predetermined aperture having an area which is smaller than the area of said plate member, means for constraining seal means in at least one of a radially inward and a radially outward direction relative to said plate member; and, seal means associated with said plate member adapted to be interposed between said plate member inner face and a portion of the panel one side which surrounds an aperture to be closed, said seal means being selectively expansible for enhancing sealing between said plate member and the associated panel.

2. The assembly of claim 1 wherein said seal means is responsive to the application of heat to permanently expand by at least 75 percent for establishing sealing contact between peripheral areas of said plate member and portions of a panel which includes an aperture to be closed.

3. The assembly of claim 2 wherein said seal means comprises a thermoplastic sealing member which increases its resistance to melting with exposure to elevated temperatures whereby said sealing member exhibits a reduced tendency to flow away from contact with said plate member and an associated panel subsequent to initial heating and expansion.

4. The assembly of claim 1 wherein said constraining means includes a constraining structure disposed radially inward of said plate member peripheral edge.

5. The assembly of claim 4 wherein said constraining structure comprises a rib-like area protruding outwardly from said plate member inner face, said rib-like area adapted to be generally received within an aperture to be closed.

6. The assembly of claim 1 wherein said constraining means includes a constraining structure disposed at least adjacent said plate member peripheral edge.

7. The assembly of claim 6 wherein said constraining structure comprises a flange at said plate member peripheral edge extending outwardly of said plate member inner face.

8. The assembly of claim 7 wherein said flange is discontinuous around said peripheral edge for allowing some controlled expansion of said seal means therethrough.

9. The assembly of claim 1 wherein said tab first portions are integrally formed with said plate member at said peripheral edge and each first portion is folded back onto said inner face within an associated recess so as to be substantially flush with said inner face, said folds each having a thickness no greater than the combined thickness of said plate member plus the first portion of the associated tab.

10. The assembly of claim 1 wherein said tabs have second portions penetrating through said seal means at areas thereof intermediate seal means inner and outer peripheries.

11. A closure assembly for a panel aperture comprising:
   a plate member having an area larger than the area of a panel aperture which is to be covered and having a generally planar inner face, a peripheral edge and a plurality of legs depending from said inner face adjacent said peripheral edge adapted to secure said plate member to a panel in an overlapping covering relationship with a panel aperture, said plate member having a plurality of spaced recesses on said inner face at said peripheral edge adjacent said legs, said legs being integral with said plate member and including:
   a first leg having a first portion integral with said peripheral edge and folded back onto said inner face within one of said recesses abutting a bottom wall of said one recess so as to lie substantially flush with said inner face, the fold area between said plate member and said first leg first portion generally at said peripheral edge having a thickness no greater than the combined thicknesses of said plate member plus said first leg first portion;
   a second leg having a first portion integral with said peripheral edge and folded back onto said inner face within another of said recesses abutting a bottom wall of said another recess so as to lie substantially flush with said inner face, the fold area between said plate member and said second leg first portion generally at said peripheral edge having a thickness no greater than the combined thicknesses of said plate member plus said second leg first portion;
   a seal means comprised of a heat expansible sealing material, said seal means adapted to be interposed between overlapping portions of said plate member inner face and one side of a panel adjacent an aperture which is to be covered; and,
   means for constraining said sealing material at least generally between overlapping portions of said plate member inner face and the one side of the panel, said constraining means comprising a first outer and a second inner constraining structure.

12. The closure assembly of claim 11 wherein said sealing material comprises a material which undergoes permanent volumetric expansion when exposed to elevated temperatures.

13. The closure assembly of claim 11 wherein said first confining structure comprises a flange depending outwardly of said plate member inner face at said peripheral edge.

14. The closure assembly of claim 13 wherein said flange is discontinuous at least at said plate member recesses.

15. The closure assembly of claim 11 wherein said second constraining structure comprises a ridge extending outwardly from said plate member inner face radially inward thereon from said first constraining structure and adapted to be at least partially received in an aperture to be covered.

16. The closure assembly of claim 11 wherein said first and second tabs each includes a second portion extending from the terminal ends of said first portions and penetrating through said seal means intermediate the inner and outer peripheries thereof.

17. A method of closing an aperture in a panel comprising the steps of:
   providing a cover plate which is larger than the aperture which is to be closed;
   having a sealing member constructed from a heat expansible material and configured to surround an aperture to be closed;
   placing said cover plate over the aperture to be closed so that a portion of the cover is in an overlapping relationship with a portion of the panel around the aperture and with said sealing member interposed between overlapping portions of said cover plate and the panel;
   fixedly securing said cover plate to the panel;
   exposing said sealing member to elevated temperatures for causing volumetric expansion thereof; and,
   constraining said sealing member at least during said step of exposing to extensively retain said heat expansible material between the overlapping portions of said plate member and the panel.

18. The method of claim 17 wherein said step of fixedly securing comprises mechanically fastening said cover plate to the panel on the opposite side thereof from where said cover plate closes the aperture.

19. The method of claim 17 wherein said step of constraining is accomplished by providing said cover plate with a downwardly depending flange at the periphery thereof and a downwardly depending rib radially inward of said flange, said rib having a peripheral conformation similar to the aperture to be covered and adapted to be at least partially received in the aperture.

* * * * *